US012496447B2

(12) United States Patent
Lim et al.

(10) Patent No.: US 12,496,447 B2
(45) Date of Patent: Dec. 16, 2025

(54) SYSTEMS AND METHODS FOR COMBINED ULTRASOUND AND ELECTRICAL STIMULATION FOR TREATING A SUBJECT

(71) Applicant: Regents of the University of Minnesota, Minneapolis, MN (US)

(72) Inventors: Hubert Lim, Minneapolis, MN (US); Daniel Zachs, Minneapolis, MN (US); Claire Kaiser, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 378 days.

(21) Appl. No.: 17/424,995

(22) PCT Filed: Mar. 10, 2020

(86) PCT No.: PCT/US2020/021811
§ 371 (c)(1),
(2) Date: Jul. 22, 2021

(87) PCT Pub. No.: WO2020/185734
PCT Pub. Date: Sep. 17, 2020

(65) Prior Publication Data
US 2022/0080197 A1 Mar. 17, 2022

Related U.S. Application Data

(60) Provisional application No. 62/816,857, filed on Mar. 11, 2019.

(51) Int. Cl.
*A61N 1/36* (2006.01)
*A61N 1/04* (2006.01)
*A61N 7/00* (2006.01)

(52) U.S. Cl.
CPC ....... *A61N 1/36034* (2017.08); *A61N 1/0492* (2013.01); *A61N 1/36021* (2013.01);
(Continued)

(58) Field of Classification Search
CPC .............. A61N 1/36034; A61N 1/0492; A61N 1/36021; A61N 1/36031; A61N 7/00; A61N 2007/0026
See application file for complete search history.

(56) References Cited

U.S. PATENT DOCUMENTS 3,236,240 A    2/1966  Bradley
2006/0167500 A1*  7/2006  Towe ...................... A61N 1/32
                                                            607/46
(Continued)

FOREIGN PATENT DOCUMENTS

CN    101888876 A    11/2010
CN    108882885 A    11/2018
(Continued)

OTHER PUBLICATIONS

Lim et al. "Noninvasive ultrasound stimulation of the spleen to treat inflammatory arthritis" Nature Communications vol. 10, Article No. 951 (2019) (Year: 2019).*
(Continued)

*Primary Examiner* — Rex R Holmes
*Assistant Examiner* — Moussa Haddad
(74) *Attorney, Agent, or Firm* — QUARLES & BRADY LLP

(57) ABSTRACT

Systems and methods are provided for combined ultrasound and electrical stimulation for treating inflammation, autoimmune disorders, rheumatoid arthritis, and the like. Noninvasive ultrasound stimulation may be applied to the spleen, joints, limbs, or a region experiencing pain that has local swelling, and electrical stimulation may be applied to the
(Continued)

face, neck, or other body region to access a peripheral nerve, vagus nerve, trigeminal nerve, or other nerves in appropriately-timed patterns to drive therapeutic effects. Stimulation timings or delay timings may be optimized based upon a desired clinical effect or treatment. Multiple targets may be stimulated in a coordinated fashion to better mimic natural physiology. A wearable ultrasound phased array device may be used to beam form energy to target the spleen while also having imaging capabilities to track the motion of the spleen to maintain localized stimulation of target regions.

19 Claims, 6 Drawing Sheets

(52) U.S. Cl.
CPC ........... *A61N 1/36031* (2017.08); *A61N 7/00* (2013.01); *A61N 2007/0026* (2013.01)

(56) References Cited

U.S. PATENT DOCUMENTS

| | | | |
|---|---|---|---|
| 2007/0219470 | A1* | 9/2007 | Talish .................... A61H 23/00 601/2 |
| 2011/0150924 | A1 | 6/2011 | Della Rocca et al. |
| 2013/0012840 | A1* | 1/2013 | Feferberg ................ A61N 1/18 601/2 |
| 2013/0274832 | A1* | 10/2013 | Manion ................... A61B 8/12 607/72 |
| 2014/0058292 | A1 | 2/2014 | Alford et al. |
| 2015/0148878 | A1 | 5/2015 | Yoo et al. |
| 2019/0001129 | A1 | 1/2019 | Rosenbluth et al. |
| 2019/0083817 | A1* | 3/2019 | Okusa ..................... A61B 8/08 |
| 2020/0046992 | A1* | 2/2020 | Tracey ................ A61B 5/6825 |
| 2023/0241387 | A1* | 8/2023 | Levine ............... A61N 1/36139 607/62 |

FOREIGN PATENT DOCUMENTS

| | | |
|---|---|---|
| JP | 2001286484 A | 10/2001 |
| JP | 2017535364 A | 11/2017 |
| WO | 0145550 A2 | 6/2001 |
| WO | 2017011298 A1 | 1/2017 |

OTHER PUBLICATIONS

Puleo et al. "Noninvasive sub-organ ultrasound stimulation for targeted neuromodulation" Nature Communications vol. 10, Article No. 952 (2019) (Year: 2019).*
Abe et al., C1 Neurons Mediate a Stress-Induced Anti-Inflammatory Reflex in Mice, Nature Neuroscience, 2017, 20(5):700-707.
Arthritis Today Magazine, What Happens if your Anti-TNF Drug Doesn't Work?, http://blog.arthritis.org/living-with-arthritis/anti-tnf-drug-failure/, Dec. 1, 2015, 5 pages.
Binstadt et al., The Same Systematic Autoimmune Disease Provokes Arthritis and Endocarditis via Distinct Mechanisms, Proceedings of the National Academy of Sciences, 2009, 106(39):16758-16763.
Chao et al., Ultrasound Phantoms Made of Gelatin Covered with Hydrocolloid Skin Dressing, The Journal of Emergency Medicine, 2013, 45(2):240-243.
Downs et al., Non-Invasive Peripheral Nerve Stimulation via Focused Ultrasound in Vivo, Physics in Medicine & Biology, 2018, 63(3):035011, pp. 1-11.
Gibofsky, Overview of Epidemiology, Pathophysiology, and Diagnosis of Rheumatoid Arthritis, The American Journal of Managed Care, 2012, 18(13):S295-S302.
Gigliotti et al., Ultrasound Modulates the Splenic Neuroimmune Axis in Attenuating AKI, Journal of the American Society of Nephrology, 2015, 26(10):2470-2481.
Inoue et al., Vagus Nervus Stimulation Mediates Protection from Kidney Ischemia-Reperfusion Injury Through α7nAChR+ Spelnocytes, The Journal of Clinical Investigation, 2016, 126(5):1939-1952.
Juan et al., Vagus Nerve Modulation Using Focused Pulsed Ultrasound: Potential Applications and Preliminary Observations in a Rat, International Journal of Imaging Systems and Technology, 2014, 24(1):67-71.
Morrow et al., Versatile, Reusable, and Inexpensive Ultrasound Phantom Procedural Trainers, Journal of Ultrasound in Medicine, 2016, 35(4):831-841.
Straub, Complexity of the Bi-Directional Neuroimmune Junction in the Spleen, Trends in Pharmacological Sciences, 2004, 25(12):640-646.
Tracey, The Inflammatory Reflex, Nature, 2002, 420(6917):853-859.
Zachs et al., Noninvasive Ultrasound Stimulation of the Spleen to Treat Inflammatory Arthritis, Nature Communications, 2019, 10(1):951, pp. 1-10.
European Patent Office, Extended Search Report, Application No. 20770765.4, Nov. 18, 2022, 8 pages.
PCT International Search Report and Written Opinion, PCT/US2020/021811, Jun. 12, 2020, 11 pages.

* cited by examiner

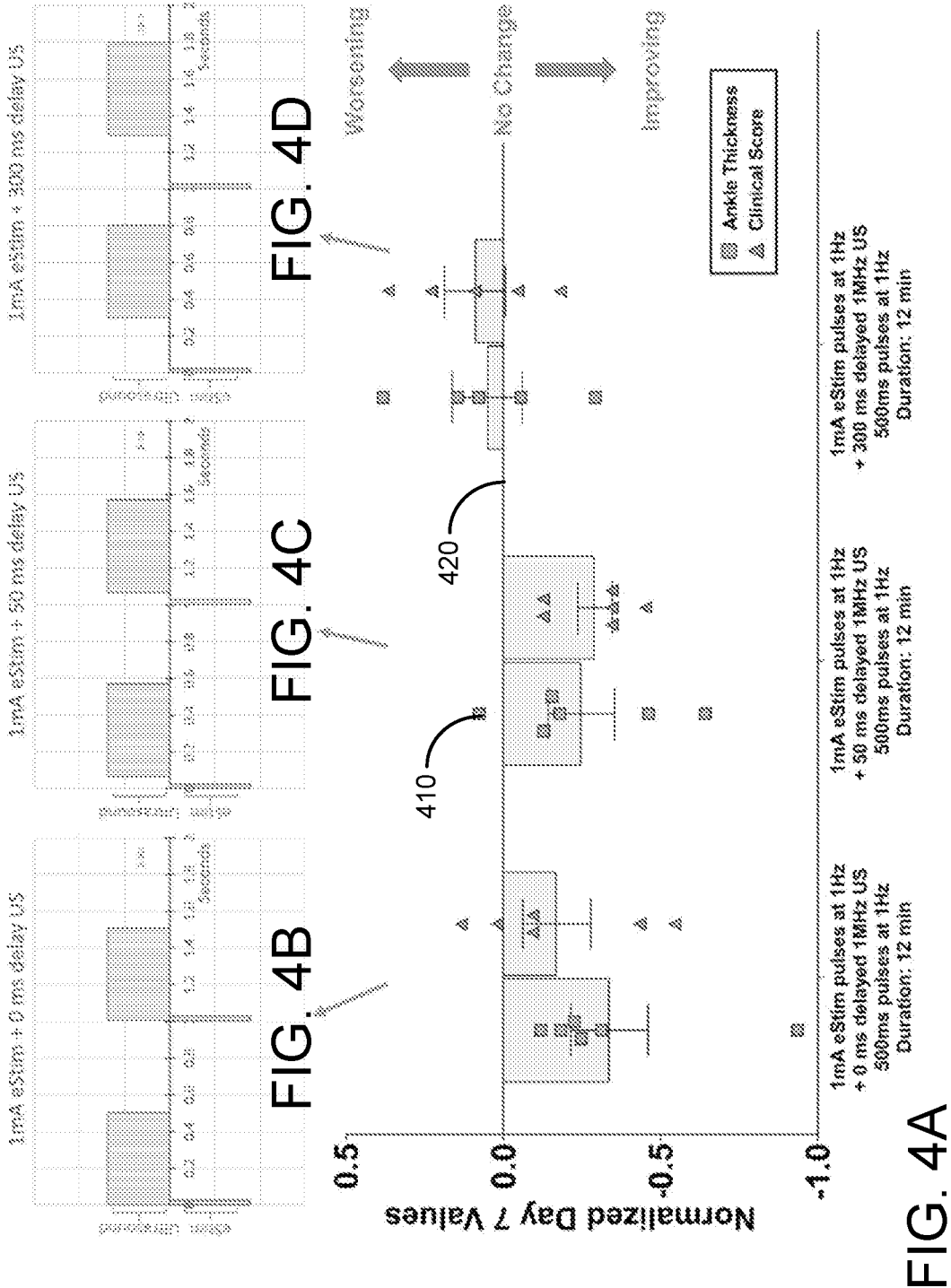

SYSTEMS AND METHODS FOR COMBINED ULTRASOUND AND ELECTRICAL STIMULATION FOR TREATING A SUBJECT

CROSS-REFERENCE TO RELATED APPLICATIONS

This application represents the U.S. National Stage of International Application No. PCT/US2020/021811, filed Mar. 10, 2020 which claims the benefit of U.S. Provisional Patent Application Ser. No. 62/816,857 filed on Mar. 11, 2019 and entitled "Systems and Methods for Combined Ultrasound and Electrical Stimulation for Treating A Subject," which is herein incorporated by reference in its entirety.

STATEMENT REGARDING FEDERALLY SPONSORED RESEARCH

This invention was made with government support under N660011824018, and HR0011-16-C-0014 awarded by the Defense Advanced Research Projects Agency. The government has certain rights in the invention.

BACKGROUND

Rheumatoid arthritis (RA) and other inflammatory conditions are often treated using disease modifying antirheumatic drugs (DMARDs) or anti-tumor necrosis factor drugs (anti-TNFs). While such treatment regimens are effective for many patients, they can cause serious side effects and still prove ineffective for a large number of patients—it is estimated that up to one third of RA patients do not respond to their first anti-TNF drug. Patients who do not respond are often prescribed non-steroid anti-inflammatory drugs (NSAIDs), which can cause addiction and other dangerous side effects.

There has been recent rapid growth and attention in the field known as electroceuticals or bioelectronics medicine in which peripheral nerves (e.g., vagus nerve) and end-organs (i.e. organs at the terminal end of a nerve conduction pathway) are stimulated to treat a wide range of health disorders. For example, there are recent studies showing that invasive vagus nerve stimulation can treat rheumatoid arthritis, irritable bowel syndrome, and many other health conditions such as tinnitus, depression, seizures, etc. There are also studies showing that activity within the spleen is a critical component for eliciting an anti-inflammatory effect that is modulated by the vagus nerve and is involved with treatment of rheumatoid arthritis, kidney failure, and liver damage, as well as implications for cancer/tumor treatment and stroke recovery.

The vagus nerve does not work in isolation of the spleen and the spleen does not work in isolation of the swollen joints/limbs. Although vagus nerve stimulation has promise, applying electrical stimulation to the vagus nerve is complex since current can flow in uncontrollable ways through the tissue and the vagus nerve is involved with many functions of the body, even life sustaining functions such as heart rate. Accessing cells within these end-organs with electrical implants is also challenging, not only to implant chips into those regions, but also to be able to target specific regions. And yet there remains a need for an effective noninvasive treatment that does not include the side effects of conventional drugs, since rheumatoid arthritis affects nearly ~1% of the world population. If other arthritis types are included in such a solution along with autoimmune/inflammatory conditions, potentially hundreds of millions of people could benefit.

SUMMARY OF THE DISCLOSURE

The present disclosure addresses the aforementioned drawbacks by providing systems and methods for combined ultrasound and electrical stimulation for noninvasively treating inflammation, autoimmune disorders, and the like. Noninvasive ultrasound stimulation may be applied to the spleen, joints, limbs, or a region experiencing pain that has local swelling, and electrical stimulation may be applied to the face, neck, ear, or other body region to access a peripheral nerve, vagus nerve, trigeminal nerve or other nerves. Appropriately timed patterns may be used to drive therapeutic effects for autoimmune and inflammatory disorders, such as rheumatoid arthritis and the like. Stimulation timings or delay timings may be optimized based upon a desired clinical effect or treatment. Multiple targets may be stimulated in a coordinated fashion to better mimic natural physiology. In some configurations, the longer the ultrasound or electrical treatment is applied, the greater the therapeutic effects may be. In some configurations, a wearable ultrasound phased array device may be used to beam form energy to target the spleen while also having imaging capabilities to track the motion of the spleen to maintain localized stimulation of target regions.

In one configuration, a method is provided for coordinated ultrasound and electrical stimulation of a subject. The method includes applying ultrasound stimulation to a first target of the subject and applying electrical stimulation to a second target of the subject. The method also includes determining stimulation parameters and a timing delay between the first target and the second target based upon the applied ultrasound stimulation and the applied electrical stimulation. Coordinated ultrasound stimulation and electrical stimulation may then be applied to the subject using the determined timing delay and stimulation parameters to treat a condition of the subject.

In some configurations, determining the timing delay may include measuring a physical size of the subject; a transit time of a signal between the first target and the second target; a speed of a signal between the first target and the second target; a heartrate of the subject; physiological requirements of a specific disease being treated; blood samples to assess changes in relevant molecular and biomarkers relevant to stimulation; EEG brain activity of localized regions related to at least one of the first or second targets; and/or a severity of inflammation in the subject. In some configurations, the timing delay may be in the range of 0 to 1000 ms, or may be 300 ms.

In some configurations, determining stimulation parameters may include determining ultrasound stimulation parameters including a duty cycle, a frequency, a pressure, a duration, a beam focus, and/or a pulse pattern. In some configurations, determining stimulation parameters may include determining electrical stimulation parameters including a current, a voltage, a frequency, a duration, a phase, a phase pattern, and/or a pulse pattern.

In some configurations, the first target is the spleen. In some configurations, the second target is a face, a neck, an ear, and/or a location on the subject proximal to a vagus nerve or trigeminal nerve.

In one configuration, a system is provided for coordinated ultrasound and electrical stimulation of a subject. The system includes an ultrasound transducer used to stimulate a first target of the subject, and an electrical stimulator to stimulate a second target of the subject. The system also includes a computer system configured to determine stimulation parameters and a timing delay between the first target and the second target based upon ultrasound stimulation of the first target and electrical stimulation of the second target. The computer system is also configured to apply coordinated ultrasound stimulation and electrical stimulation to the subject using the determined timing delay and stimulation parameters to treat a condition of the subject.

In one configuration, a computer-implemented method is provided for generating signals to be used in coordinated ultrasound and electrical stimulation of a subject. The computer-implemented method includes generating a first control signal configured for triggering an ultrasound stimulation to a first target of the subject and generating a second control signal configured for triggering an electrical stimulation to a second target of the subject. The computer-implemented method also includes determining stimulation parameters and a timing delay between the first target and the second target based upon the ultrasound stimulation first control signal and the electrical stimulation second control signal. A third control signal may be generated for coordinated ultrasound stimulation and electrical stimulation of the subject using the determined timing delay and stimulation parameters for treating a condition of the subject.

In some configurations of the computer-implemented method, the timing delay includes measuring at least one of: a physical size of the subject; a transit time of a signal between the first target and the second target; a speed of a signal between the first target and the second target; a heartrate of the subject; physiological requirements of a specific disease being treated; blood samples to assess changes in relevant molecular and biomarkers relevant to stimulation; EEG brain activity of localized regions related to at least one of the first or second targets; and/or a severity of inflammation in the subject. In some configurations, the timing delay is in the range of 0 to 1000 ms. In some configurations, the timing delay is less than or equal to 300 ms.

In some configurations of the computer-implemented method, the first target is the spleen. The second target may be at least one of: a face; a neck; an ear; or a location on the subject proximal to a vagus nerve or trigeminal nerve.

In some configurations of the computer-implemented method, generating the third control signal for coordinated ultrasound stimulation and electrical stimulation of the subject includes generating the control signal for at least one wearable device located on the subject. Compensating for motion of the first target may be performed using ultrasound beam steering.

In some configurations of the computer-implemented method, determining stimulation parameters includes determining ultrasound stimulation parameters including at least one of: a duty cycle, a frequency, a pressure, a duration, a beam focus, and/or a pulse pattern. Determining stimulation parameters may include determining electrical stimulation parameters including at least one of: a current, a voltage, a frequency, a duration, a phase, a phase pattern, and/or a pulse pattern.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

BRIEF DESCRIPTION OF THE DRAWINGS

FIG. 4A is a graph depicting a non-limiting example result of using combined ultrasound and electrical stimulation in which therapeutic effects depends on the delay between the two modalities.

FIG. 4B is a detailed view of a portion of FIG. 4A showing ultrasound and electrical stimulation timings.

FIG. 4C is a detailed view of another portion of FIG. 4A showing ultrasound and electrical stimulation timings.

FIG. 4D is a detailed view of yet another portion of FIG. 4A showing ultrasound and electrical stimulation timings.

DETAILED DESCRIPTION

Systems and methods are provided for coordinated non-invasive neuromodulation. Ultrasound stimulation may be applied to the spleen and/or to the joints, limbs, or other region experiencing pain that has local swelling, combined with electrical stimulation of the neck, face, or other body region in appropriately-timed patterns to drive therapeutic effects for autoimmune and inflammatory disorders, such as rheumatoid arthritis. The coordinated or combined ultrasound and electrical stimulation approach exploits natural body functions where these different pathways and local regions are being activated in coordinated ways to achieve healing effects. The systems and methods in the present disclosure mimic these more natural processes to provide for more enhanced healing than could be provided by non-coordinated stimulation or with either stimulation alone. Simply artificially stimulating just the vagus nerve over and over again or just the spleen over and over again is expected to have substantially suboptimal effects because different components of the body do not naturally work in isolation but are interconnected and require co-activation in appropriately timed patterns for synergetic and enhanced outcomes.

Neuromodulation techniques of the present disclosure have the potential to directly modulate cells in the spleen or end-organs. These techniques may also replace drug treatments for many health disorders and reduce side effects. The larger population of RA patients who receive effective treatments using anti-TNFs may also supplement their drug treatment regimen with the present systems and methods for noninvasive ultrasound and electrical stimulation in order to reduce or minimize unwanted side effects.

Figure 1:
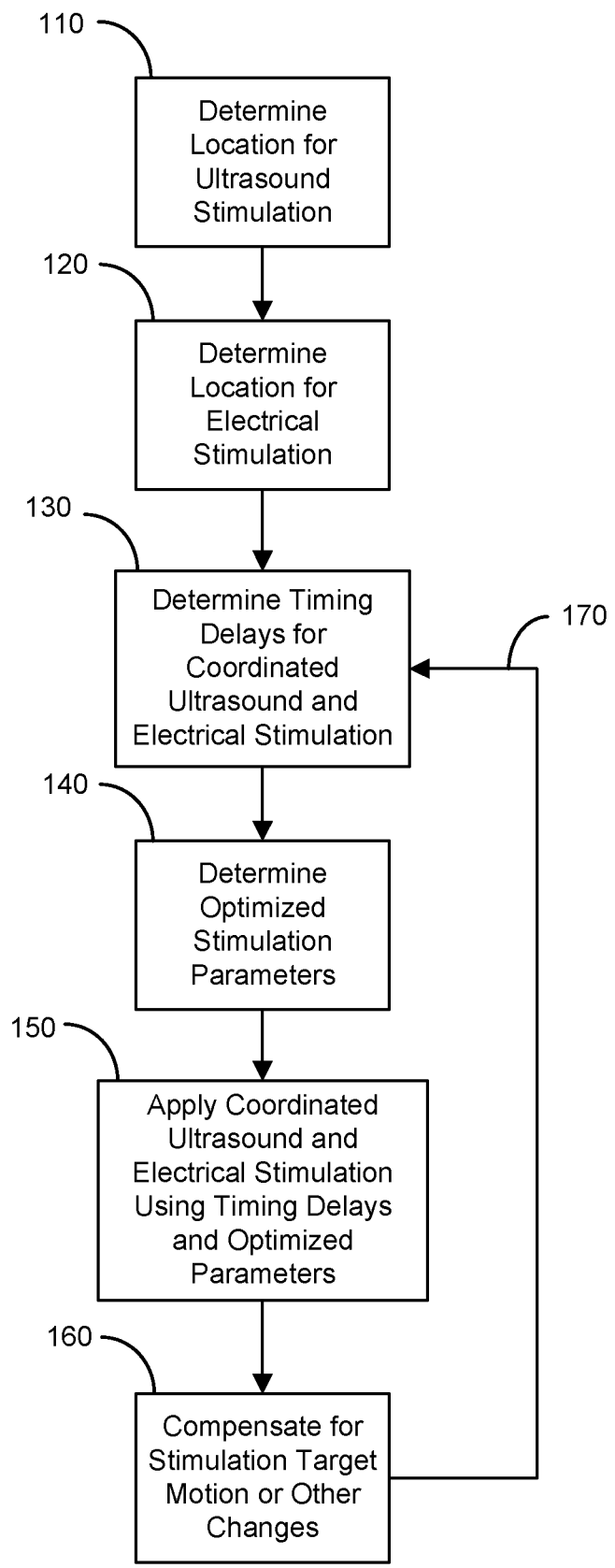
FIG. 1 depicts a non-limiting example flow chart for providing coordinated ultrasound and electrical stimulation.

Referring to FIG. 1, a flow chart is provided depicting non-limiting example steps for coordinated ultrasound and electrical stimulation. A location for ultrasound stimulation may be determined at step 110. Non-limiting examples of determining an ultrasound location include: selecting a position on a subject for placing a body-worn ultrasound device, selecting a position on a subject for placing a conventional ultrasound probe, or adjusting the ultrasound stimulation target on or within the spleen as described below, such as by using beam steering. In some configurations, the method may be implemented on or by a computer system.

A location for electrical stimulation may be determined at step 120. The location may be determined based upon access or proximity to a peripheral nerve, vagus nerve, trigeminal nerve, or other nerves. In some configurations, the location for noninvasive electrical stimulation (EStim) may be determined to be on the surface of the face, neck, ear, or other body region to modulate the vagus nerve pathways to the spleen and brain that can further treat a subject's condition, such as rheumatoid arthritis. In some configurations, the electrical stimulation may be delivered by a body-worn device or patch that may be left in place on the subject for extended periods of time while delivering treatment. The location for the electrical stimulation may be partly based upon how the device or patch may be physically placed on a subject. The location of stimulation can be adjusted, for example, based on the ability to modify heart rate or the ability to elicit the largest evoked potentials based on EEG recordings that can localize brainstem regions receiving projections from vagus nerve or trigeminal nerve pathways. In some configurations, multiple electrical stimulation devices may be placed at different locations on a subject, and which electrical stimulator is activated or used may be based upon feedback from the results of the ultrasound stimulation.

Timing delays for coordinated ultrasound and electrical stimulation may be determined at step 130. These timing delays between the coordinated ultrasound and electrical stimulations may be optimized for a desired clinical effect, such as to reduce inflammation in the subject. In some configurations, the delay timings may take into account the physical size of a patient, the transit time or the speed of the signal from the ultrasound or electrical stimulations to a desired location, and the like. The timing may also be tailored for the specific disease being treated or the severity of the disease in the individual patient, based on the desired duration or required intensity of the targeted anti-inflammatory state. In one configuration, stimulation by either electrical and/or ultrasound to their respective locations and then measuring the signal received at the other location and the time it takes for that signal to be received may be used for determining the timing delay. In some configurations, a heart rate of a subject may be measured to determine an optimal timing delay based upon a previous stimulation. Timing delays may range between 0 to 1000 ms between locations. In one configuration, a timing delay may be less than 100 ms. As shown in FIG. 4A, more effective therapy for treating inflammation in mice occurred when using a delay of 50 ms or lower in which much longer delays such as 300 ms was not effective. These data demonstrate that appropriate delays between ultrasound and electrical stimulation are critical for treatment efficacy. The large dimensions of the human body can benefit from a larger range of delays including several hundred milliseconds up to 1000 ms.

Figure 3:
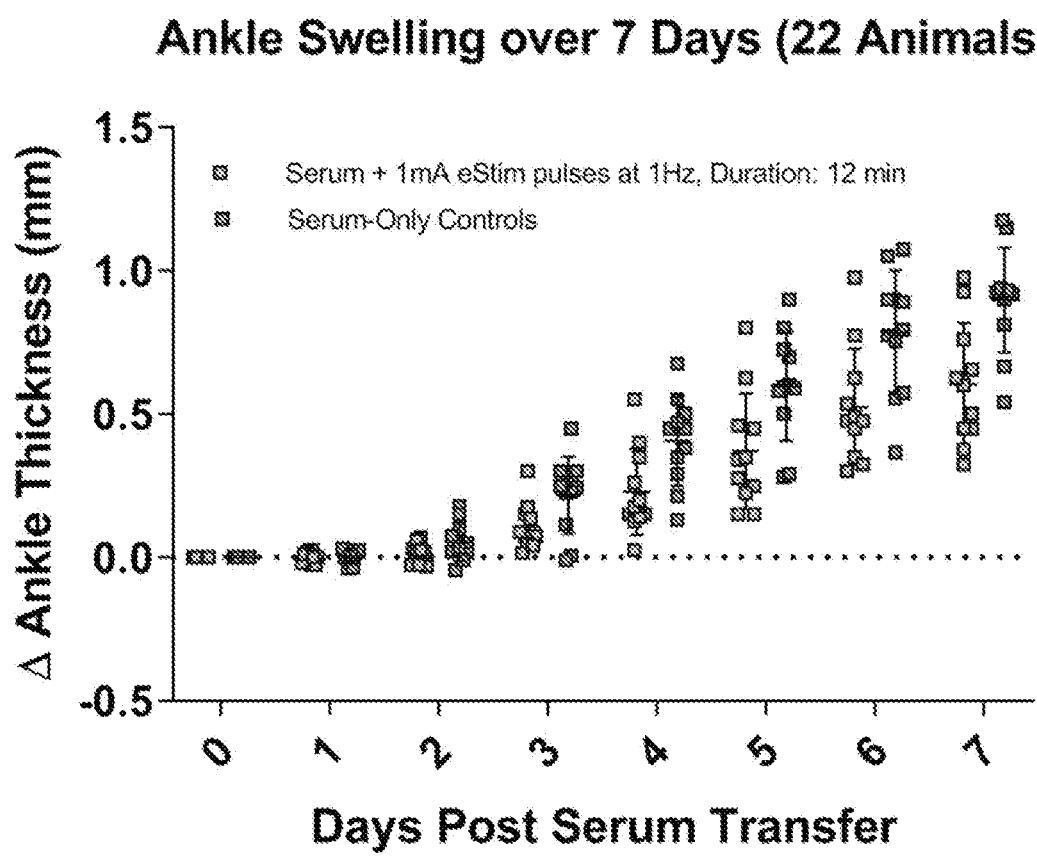
FIG. 3 is a graph depicting a non-limiting example result of electrical stimulation only.

Optimized stimulation parameters may be determined at step 140. Optimized stimulation parameters may be determined based upon the desired clinical outcome and/or the timing delays desired, as described above, and may allow for custom parameters for each subject or clinical treatment. For ultrasound stimulation, optimized stimulation parameters may include determining duty cycle, frequency, pressure, duration, beam focus, pulse pattern, and the like. In some configurations, ultrasound at 1 MHz with a 1 s on and 5 s off pattern may be effective at ~350 kPa, as shown in FIG. 4A. In other configurations, ultrasound stimulation may be below 1 MHz. In a non-limiting example, ultrasound stimulation may be 500 kHz. For electrical stimulation pulses, optimized parameters may include current, voltage, frequency, duration, phase, pulse pattern, and the like. In some configurations, electrical stimulation of 1 mA at 1 Hz may be effective for treatment, as shown in FIG. 3 and FIG. 4A. In other configurations, electrical stimulation may be in the range of 25-30 Hz for effective treatment. In additional configurations, electrical stimulation of 500 µA may be effective for treatment. Stimulations may be repeated for up to 30-60 minutes per day. In some configurations, stimulation times may be conducted for 2 minutes at a time, 12 minutes at a time, as in FIG. 4A, or until a desired clinical result is achieved, such as the reduction of inflammation measured for a subject. In other configurations, stimulation may be provided continually by devices worn by the subject. Other parameters, such as timing between modalities, may also be used for optimal therapy.

Non-limiting example ultrasound stimulation parameters are listed in Table 1 below. Table 1 includes expanded and optimized parameter ranges. Non-limiting example electrical stimulation parameters are also listed in Table 2 below. Table 2 similarly includes expanded and optimized parameter ranges.

TABLE 1

Ultrasound Stimulation Parameters

| Parameter | Expanded Range | Optimized Range |
|---|---|---|
| Center Frequency | 100 kHz-7 MHz | 500 kHz-1 MHz |
| Pulse Repetition Rate | Stimulation on: 50 ms-2 second Stimulation off: 50 ms-10 seconds | 350 ms on/650 ms off 500 ms on/500 ms off 1 second on/6 seconds off |
| Treatment Duration | 1 minute-1 hour sessions | 2 minutes-30 minutes sessions |
| Pressure at Target Area | 25 MPa-2 MPa | 100 kPa-500 kPa |
| Duty Cycle | 10%-100% | 16%-50% |
| Focus/Targeting | Full organ or sub-organ area | |
| Imaging | Non-limiting example: Ultrasound imaging techniques | |

TABLE 2

Electrical Stimulation Parameters

| Parameter | Expanded Range | Optimized Range |
|---|---|---|
| Current Level Applied | 100 uA-5 mA | 500 uA-2 mA |
| Pulse Rate (Pulses per second) | 0.5 Hz-100 Hz | 1 Hz-25 Hz |
| Pulse Duration | 200 us-5 ms | 500 us-3 ms |
| Inter-phase gap | 0 ms-1 ms | 0 ms-1 ms |
| Duration | 1 minute-1 hour sessions | 2 minutes-30 minutes sessions |
| Delay between Ultrasound and Electrical Stimulation | 0 ms-±1000ms | <300 ms |

In some configurations, optimized stimulation parameters include optimized stimulation pulse patterns. Non-limiting example pulse patterns for ultrasound include 16.7% duty cycle with 1 s on and 5 s off, a 50% duty cycle with 500 ms on and 500 ms off, a 35% duty cycle with 350 ms on and 650 ms off, or any range of pulse pattern timing and duty cycles between these parameters and any combination thereof. Any suitable pulse pattern may be used, such as an unmodulated burst of pulses, sinusoid modulated pulse trains, chirp pulses, spike pulses, and the like. Some non-limiting example electrical signal pulse patterns and waveforms are listed in Table 3 below.

TABLE 3

| Pulse Pattern and Waveforms | |
|---|---|
| Pulse Pattern | Monophasic, biphasic, asymmetric, alternating |
| Phase Pattern | Symmetrical or asymmetrical phase shape with balanced charge |
| Electrical Output Measurements/Imaging | Non-limiting example: EEG or other bio-recordings |

Coordinated ultrasound and electrical stimulation may be applied to a subject at step 150 using the determined timing delays and optimized parameters as described above. The coordinated stimulation may be adjusted to compensate for target or subject motion in step 160, or to take into consideration other changes that may occur. The process of determining stimulation parameters and delivering a coordinated ultrasound and electrical stimulation to a subject may be repeated as indicated by pathway 170. Non-limiting examples of repeatedly determining optimal parameters and providing stimulation include repeating the process for each stimulation, for a determined number of stimulations, as triggered by a change such as target motion, or as determined by a user.

Figure 2A:
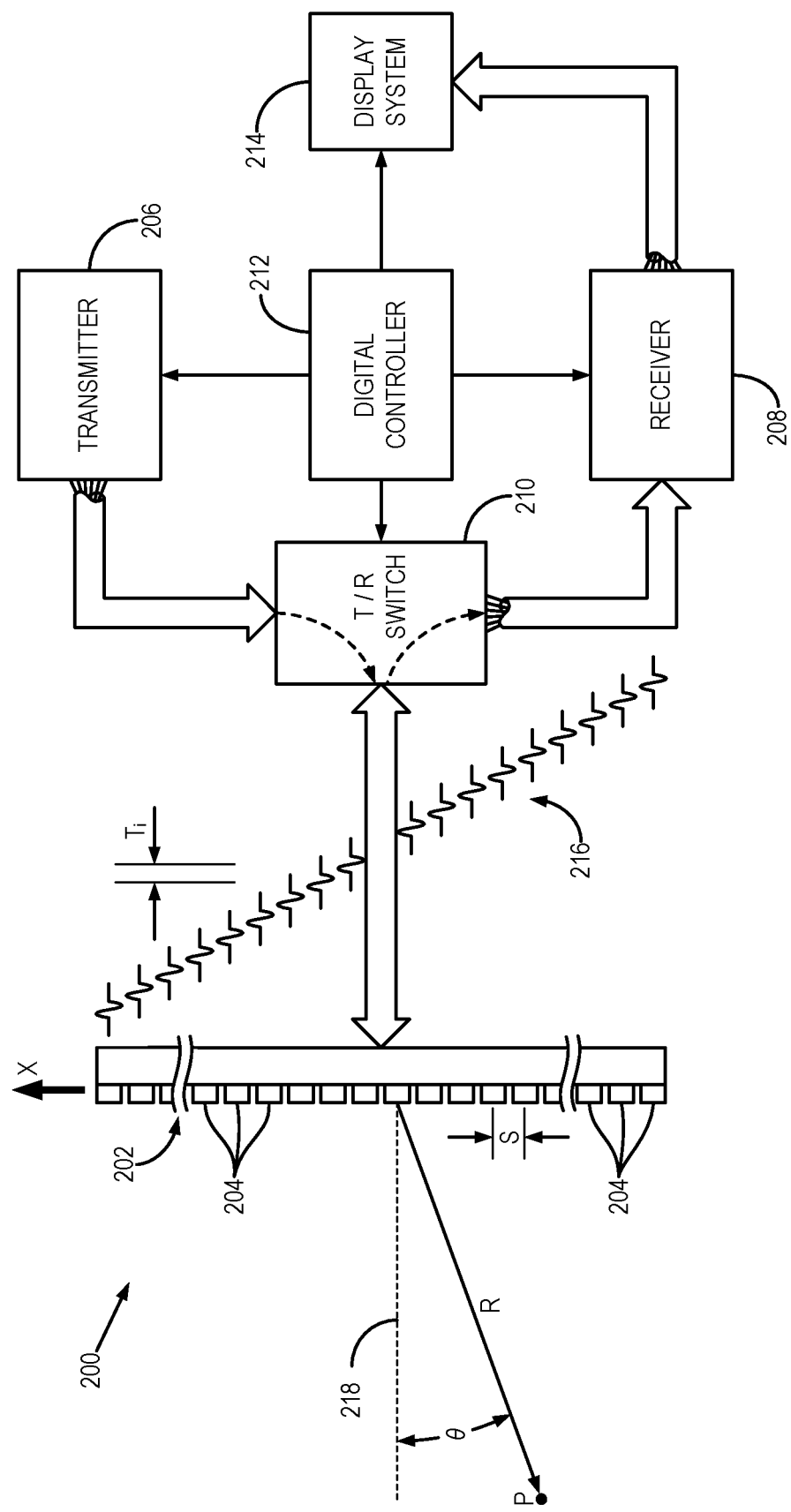
FIG. 2A is a block diagram of an ultrasound system that may be used with the systems and methods of the present disclosure.

FIG. 2A illustrates an example of an ultrasound system 200 that can be used to implement the methods described in the present disclosure. The ultrasound system 200 includes a transducer array 202 that includes a plurality of separately-driven transducer elements 204. The transducer array 202 can include any suitable ultrasound transducer array, including linear arrays, curved arrays, phased arrays, and so on. Similarly, the transducer array 202 can include a 1D transducer, a 1.5D transducer, a 1.75D transducer, a 2D transducer, a 3D transducer, and so on.

When energized by a transmitter 206, a given transducer element 204 produces a burst of ultrasonic energy. The ultrasonic energy reflected back to the transducer array 202 (e.g., an echo) from the object or subject under study is converted to an electrical signal (e.g., an echo signal) by each transducer element 204 and can be applied separately to a receiver 208 through a set of switches 210. The transmitter 206, receiver 208, and switches 210 are operated under the control of a controller 212, which may include one or more processors. As one example, the controller 212 can include a computer system.

The transmitter 206 can be programmed to transmit unfocused or focused ultrasound waves. In some configurations, the transmitter 206 can also be programmed to transmit diverged waves, spherical waves, cylindrical waves, plane waves, or combinations thereof. Furthermore, the transmitter 206 can be programmed to transmit spatially or temporally encoded pulses.

The receiver 208 can be programmed to implement a suitable detection sequence for the imaging task at hand. In some embodiments, the detection sequence can include one or more of line-by-line scanning, compounding plane wave imaging, synthetic aperture imaging, and compounding diverging beam imaging.

In some configurations, the transmitter 206 and the receiver 208 can be programmed to implement a high frame rate. For instance, a frame rate associated with an acquisition pulse repetition frequency ("PRF") of at least 100 Hz can be implemented. In some configurations, the ultrasound system 200 can sample and store at least one hundred ensembles of echo signals in the temporal direction.

The controller 212 can be programmed to implement an imaging sequence using the techniques described in the present disclosure, or as otherwise known in the art. In some embodiments, the controller 212 receives user inputs defining various factors used in the design of the imaging sequence.

A scan can be performed by setting the switches 210 to their transmit position, thereby directing the transmitter 206 to be turned on momentarily to energize transducer elements 204 during a single transmission event according to the designed imaging sequence. The switches 210 can then be set to their receive position and the subsequent echo signals produced by the transducer elements 204 in response to one or more detected echoes are measured and applied to the receiver 208. The separate echo signals from the transducer elements 204 can be combined in the receiver 208 to produce a single echo signal.

In some configurations, ultrasound system 200 may include more than one ultrasound array 202. At least one of the arrays may be used for transmitting ultrasound for therapeutic treatment, and at least one other array may be used to transmit and/or receive ultrasound for imaging. In one non-limiting example, the frequency used for treatment may be lower than the frequency used to produce high-quality images.

The echo signals are communicated to a processing unit (not shown), which may be implemented by a hardware processor and memory, to process echo signals or images generated from echo signals. As a non-limiting example, the processing unit can target the spleen for ultrasound stimulation to treat inflammation using the methods described in the present disclosure. Images produced from the echo signals by the processing unit can be displayed on a display system 214.

In one non-limiting example, a wearable/miniaturized phased array ultrasound device may be used for ultrasound system 200. The wearable device may be placed on a subject and worn for extended periods of time. In some configurations, a reprogrammed smartphone or tablet device may be used to control and/or monitor the stimulation. In one non-limiting example, the reprogrammed smartphone or tablet device may allow for Bluetooth wireless control of the stimulation device. In some configurations, the control and/or monitor system may be an application installed on a smartphone, tablet device, and the like. In another non-limiting example, a number of devices distributed around a subject may be used to provide the ultrasound stimulation. The overall size of a wearable device may be similar to that of other consumer electronic wearable devices, such as smart watches, when using miniaturized ultrasound array technology. In one non-limiting example, the total footprint of a device may be less than 1.2 cm×1.2 cm. In another non-limiting example, the footprint of a device may be less than 40×40 mm. In some non-limiting examples, the total footprint of the device may be larger, such as to cover a larger region of the spleen or other organ. In one non-limiting example, the footprint of the device is the same size as a spleen, which may range from 8-16 cm.

In some configurations, the ultrasound transducer elements 204 can be activated in unison to form a plane wave front. In other configurations, the ultrasound transducer elements 204 can be activated sequentially to form an angled or focused wave front.

In some configurations, beam steering may be used to target selected locations on or in the spleen with ultrasound stimulation. Locations may be selected to optimize the effects of treatment, such as by targeting neural pathways within the spleen. Optimized effects may include modulating the cholinergic anti-inflammatory immune reflex circuit to decrease a subject's inflammation and treat rheumatoid arthritis. This anti-inflammatory reflex pathway involves circuits in the brain (e.g., medulla oblongata C1 neuron activation and hypothalamic-pituitary responses) that project via the vagus nerve to the spleen as well as reciprocal pathways back to the brain, coordinating the immune response of the body.

In some configurations, a wearable energy delivery device will have the capability to image and transmit ultrasound energy to a specified target. Imaging and/or beam steering may also be used to compensate for motion of the spleen, such as changes in depth due to subject motion. The spleen naturally moves in the abdominal cavity during heavy breathing and changes in body position. With imaging feedback, the ultrasound beam focus point can be realigned as the distance to the surface of the spleen changes relative to the transducer array. This provides the potential for closed-loop device operation with the implementation of automated re-targeting algorithms. One non-limiting example of an ultrasound device capable of both imaging and stimulation includes a piezoelectric micromachined ultrasonic transducer (pMUT).

To accomplish a beam steered scan, the transmitter 206 imparts a time delay, $T_i$, to the respective pulses 216 that are applied to successive transducer elements 204. If the time delay is zero, $T_i=0$, all of the transducer elements 204 will be energized simultaneously and the resulting ultrasonic beam will be directed along an axis 218 normal to the face of the transducer 202 and originating from the center of the transducer array 202. As the time delay increment, $T_i$, is increased, the ultrasonic beam is directed away from the central axis 218 by an angle, θ. The relationship between the time delay increment, $T_i$, added successively to each $i^{th}$ signal from one end of the transducer array 202, i=1, to the other end, i=n, is given by the following relationship:

$$T_i = T_0 + \left(i - \frac{(n-1)}{2}\right) \cdot \left(\frac{S \cdot \sin(\theta)}{c}\right) + \left(i - \frac{(n-1)}{2}\right)^2 \cdot \left(\frac{S^2 \cdot \cos(2\theta)}{2Rc}\right); \quad (1)$$

where S is an equal spacing between centers of adjacent transducer elements 204; c is the velocity of sound in the object under study; R is a range, or depth, at which the transmit beam is to be focused; and $T_0$ is a delay offset that insures that all calculated time delay increment values, $T_i$, are positive values.

The second term in Eqn. (1) steers the beam to the desired angle, θ, and the third term is employed when the transmitted beam is to be focused at a fixed range, R. A sector scan is performed by progressively changing the time delays, in successive excitations. In this manner, the angle, θ, is changed in increments to steer the transmitted beam in a succession of directions. When the direction of the beam is above the central axis 218, the timing of the pulses is reversed; however, Eqn. (1) still applies in this situation.

The echo signals produced by each burst of ultrasonic energy emanate from reflecting objects located at successive ranges, or depths, R, along the ultrasonic beam. These are sensed separately by each transducer element 204 in the transducer array 202, and a sample of the magnitude of each echo signal at a particular point in time represents the amount of reflection occurring at a specific range, R. Due to the differences in the propagation paths between a focal point, P, and each transducer element 204, however, these echo signals will not occur simultaneously and their amplitudes will not be equal. A function of the receiver 208 is to amplify and demodulate these separate echo signals, impart the proper time delay to each, and sum them together to provide a single echo signal that accurately indicates the total ultrasonic energy reflected from each focal point, P, located at successive ranges, R, along the ultrasonic beam oriented at the angle, θ.

Under the direction of the digital controller 212, the receiver 208 provides delays during the scan such that the steering of the receiver 208 tracks with the direction of the beam steered by the transmitter 206, and such that the receiver 208 samples the echo signals at a succession of ranges, R, and provides the proper delays to dynamically focus at points, P, along the beam. Thus, each emission of an ultrasonic pulse results in the acquisition of a series of data points that represent the amount of reflected sound from a corresponding series of points, P, located along the ultrasonic beam.

In some configurations a physical device, such as a cone, may be used to steer the ultrasound beam to the target location. It will be appreciated by one skilled in the art that other options for directing ultrasound to a target location may be used with the present disclosure.

Figure 2B:
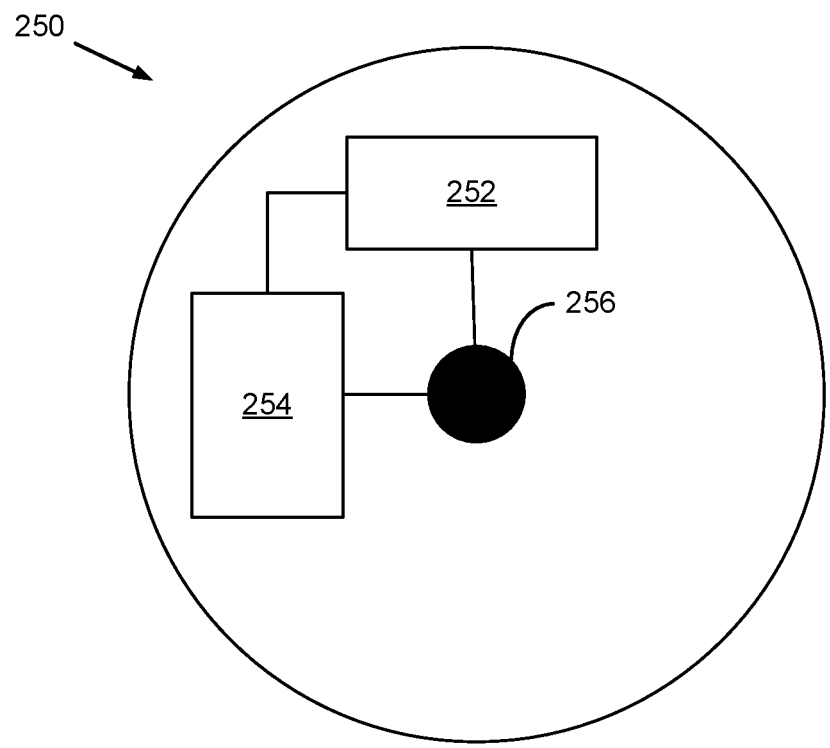
FIG. 2B is a diagram of a non-limiting example wearable electrode system.

Referring to FIG. 2B, a non-limiting example wearable electrode system 250 is shown. Power supply 254 provides power to controller 252 and electrode 256. Power supply 254 may be a battery, a wired power supply connected to an external power source, a wireless power system, and the like. Controller 252 may receive a signal from an external system including stimulation parameters for controlling the electrode 256, or the controller may contain onboard preprogrammed stimulation parameters and instructions for controlling electrode 256. In some configurations, controller 252 is wirelessly connected to an external smartphone or tablet that conveys the stimulation parameters and instructions for providing stimulation to a subject. Electrode 256 may be a single electrical patch in contact with a subject, or electrode 256 may include any number of electrical patches. In one non-limiting example, the electrical electrode 256 includes a conductive layer, such as a sticky gel layer, to provide higher conductivity and comfortable stimulation of the body surface.

Figure 2C:
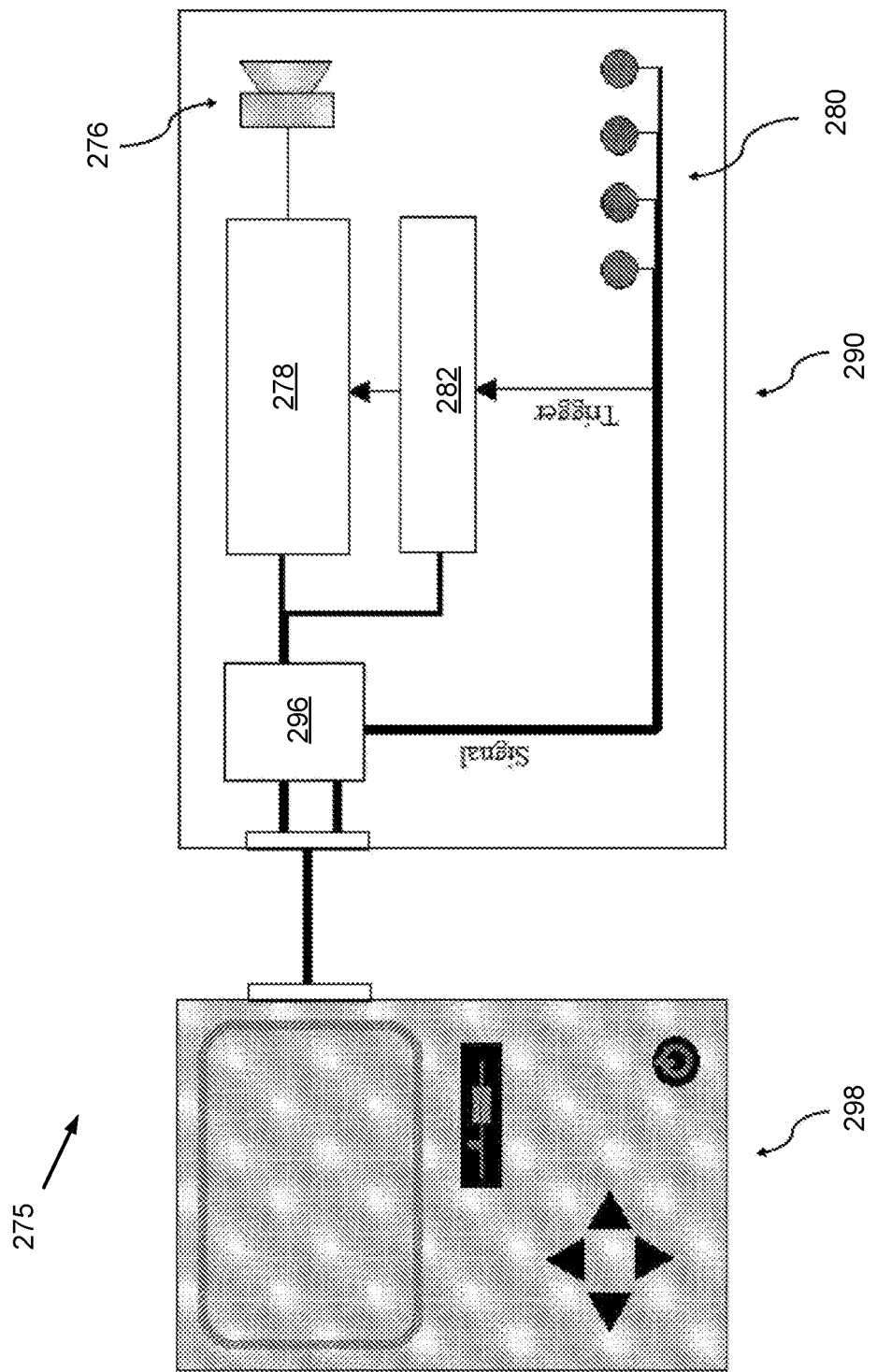
FIG. 2C is a diagram of a non-limiting example combined ultrasound and electrical stimulation system.

Referring to FIG. 2C, a non-limiting example of a combined ultrasound and electrical stimulation system 275 for coordinated stimulation is shown. The system includes an ultrasound stimulation device 276 with an ultrasound stimulator generator 278, and one or more electrodes 280 with electrical stimulation generator 282. Body-worn system 290 may be coupled with an external controller 298 that can generate stimulation parameters to direct ultrasound and electrical stimulation pulses to be delivered using the ultrasound stimulation device 276 and one or more electrodes 280 respectively. A transceiver 296 may be included to allow signals to be wirelessly communicated between the external controller 298 and the body-worn device 276. In some configurations, the external controller 298 may be smartphone or a tablet. In some configurations, the body-worn system 290 may be two separated devices with one providing ultrasound stimulation and the second providing electrical stimulation. In other configurations, the electrical stimulator and ultrasound stimulator may be integrated into one component. In one or more implementations, the one or more electrodes 280 includes an array of electrodes. The one or more electrodes 280 may be strategically placed on the body-worn system 290 housing where it touches near the face, neck, ear (e.g., on the top of the ear, around the pinna, or even inside the ear canal when using an ear-insert type of hearing aid), or other body location.

In one or more implementations, the body-worn system 290 includes a wireless transceiver 296 and power component (which may be integrated into the body-worn system 290 or the controller 298, and which may use, e.g., Bluetooth or other communications protocols) that powers the system and allows for, for example, communication of stimulation parameters and commands. This wireless transceiver and power component 296 could be worn on the body or around the neck to allow the system to be powered and controlled for sound and electrical stimulation.

The apparatus includes ultrasound stimulator generator 278 and electrical stimulation generator 282 that are configured to compute and process various stimulation strategies. The stimulation strategies are based on received stimulation parameters for providing ultrasound and electrical stimulations to treat a condition of a subject.

Referring to FIG. 3, non-limiting example results are show where surface EStim of the neck area decreased inflammation. In other configurations, different locations may be used to optimize the clinical effects of the combined ultrasound and electrical stimulations.

Referring to FIGS. 4A, 4B, 4C, and 4D, graphs depicting a non-limiting example result of using combined ultrasound and electrical stimulation in which therapeutic effects depends on the delay between the two modalities are shown. Referring to FIG. 4A, one non-limiting example is depicted where the results may be assessed to determine optimized stimulation parameters according to step 140 in FIG. 1. In particular, data points 410 may be evaluated as improving or worsening a clinical condition based upon being above or below an established threshold line 420. Referring to FIG. 4B, the ultrasound and electrical stimulation timings are shown for one portion of FIG. 4A data. Referring to FIG. 4C, the ultrasound and electrical stimulation timings are shown for another portion of FIG. 4A data. Referring to FIG. 4D, the ultrasound and electrical stimulation timings are shown for yet another portion of FIG. 4A data.

In other configurations, a curve fit, or a determination of a local minimum/maximum in the acquired data may be used to determine an optimized stimulation parameter. In some configurations, blood samples may be collected to test for changes in inflammation-related biomarkers. In some configurations, ultrasound imaging of joints, clinical scoring, evaluating change in quality of life using Health Assessment Questionnaires, and the like may be used to determine optimized parameters. One skilled in the art will appreciate that other methods are available for determining an optimum parameter.

In one example, the therapeutic benefits of US in reducing chronic inflammation were evaluated in a mouse model of arthritis. Wildtype CS7BL/6 (B6) mice were injected intraperitoneally with an arthritis serum transfer from a line of K/B×N transgenic mice. Ultrasound was noninvasively applied to the spleen daily using a single US transducer. Disease progression was monitored daily by measuring ankle thickness, weight, and clinical disease score. Optimized ultrasound waveform parameters for decreasing inflammation were discovered by exploring a broad range of different frequencies, pulse widths, and time durations across numerous experiments, using ankle thickness to monitor decreased inflammation.

The present disclosure has described one or more preferred embodiments, and it should be appreciated that many equivalents, alternatives, variations, and modifications, aside from those expressly stated, are possible and within the scope of the invention.

What is claimed is:

1. A method for coordinated ultrasound and electrical stimulation of a subject, comprising:
    applying ultrasound stimulation to a first target of the subject,
        the first target comprising an intraabdominal organ comprising the spleen;
    applying electrical stimulation to a second target of the subject using a surface electrode,
        the second target comprising a body surface of the subject comprising at least one of a face, a neck, an ear, or a location on the subject proximal to a vagus nerve or trigeminal nerve;
    determining stimulation parameters and a timing delay between the first target and the second target based upon at least one of a physical size of the subject, a transit time of a signal between the first target and the second target, a speed of a signal between the first target and the second target, a heartrate of the subject, physiological requirements of a specific disease being treated, blood samples to assess changes in relevant molecular and biomarkers relevant to stimulation, EEG brain activity of localized regions related to at least one of the first or second targets, or a severity of inflammation in the subject; and
    applying the coordinated ultrasound stimulation and electrical stimulation to the subject using the determined timing delay and stimulation parameters.

2. The method of claim 1, wherein the timing delay is in the range of 0 to 1000 ms.

3. The method of claim 2, wherein the timing delay is less than 300 ms.

4. The method of claim 1, wherein the coordinated ultrasound stimulation and electrical stimulation includes using at least one wearable device located on the subject.

5. The method of claim 1, further comprising compensating for motion of the first target using ultrasound beam steering.

6. The method of claim 1, wherein determining stimulation parameters includes determining ultrasound stimulation parameters including at least one of:
    a duty cycle,
    a frequency,
    a pressure,
    a duration,
    a beam focus, or
    a pulse pattern.

7. The method of claim 6, wherein the pulse pattern includes at least one of:
    unmodulated burst of pulses,
    sinusoid modulated pulse trains,
    chirp pulses, or
    spike pulses.

8. The method of claim 1, wherein determining stimulation parameters includes determining electrical stimulation parameters including at least one of:
    a current,
    a voltage,
    a frequency,
    a duration,
    a phase,
    a phase pattern, or
    a pulse pattern.

9. A system for coordinated ultrasound and electrical stimulation of a subject, comprising:
- an ultrasound transducer to stimulate a first target of the subject,
  - the first target comprising an intraabdominal organ comprising the spleen;
- an electrical stimulator to stimulate a second target of the subject using a surface electrode,
  - the second target comprising a body surface of the subject comprising at least one of a face, a neck, an ear, or a location on the subject proximal to a vagus nerve or trigeminal nerve; and
- a computer system configured to:
  - determine stimulation parameters and a timing delay between the first target and the second target based upon at least one of a physical size of the subject, a transit time of a signal between the first target and the second target, a speed of a signal between the first target and the second target, a heartrate of the subject, physiological requirements of a specific disease being treated, blood samples to assess changes in relevant molecular and biomarkers relevant to stimulation, EEG brain activity of localized regions related to at least one of the first or second targets, or a severity of inflammation in the subject; and
  - apply the coordinated ultrasound stimulation and electrical stimulation to the subject using the determined timing delay and stimulation parameters.

10. The system of claim 9, wherein the timing delay is in the range of 0 to 1000 ms.

11. The system of claim 10, wherein the timing delay is less than 300 ms.

12. The system of claim 9, wherein the first target is the spleen.

13. The system of claim 9, wherein the coordinated ultrasound stimulation and electrical stimulation includes using at least one wearable device located on the subject.

14. The system of claim 9, further comprising wherein the computer system is configured to compensate for motion of the first target using ultrasound beam steering.

15. The system of claim 9, wherein determining stimulation parameters includes determining ultrasound stimulation parameters including at least one of:
- a duty cycle,
- a frequency,
- a pressure,
- a duration,
- a beam focus, or
- a pulse pattern.

16. The system of claim 15, wherein the pulse pattern includes at least one of:
- unmodulated burst of pulses,
- sinusoid modulated pulse trains,
- chirp pulses, or
- spike pulses.

17. The system of claim 9, wherein determining stimulation parameters includes determining electrical stimulation parameters including at least one of:
- a current,
- a voltage,
- a frequency,
- a duration,
- a phase,
- a phase pattern, or
- a pulse pattern.

18. The system of claim 9, wherein the computer system, when applying the coordinated ultrasound stimulation and electrical stimulation to the subject, is further configured to:
- apply the coordinated ultrasound stimulation and electrical stimulation to the subject to treat a condition of the subject, wherein the condition comprises rheumatoid arthritis.

19. The method of claim 1, wherein applying the coordinated ultrasound stimulation and electrical stimulation to the subject further comprises:
- applying the coordinated ultrasound stimulation and electrical stimulation to the subject to treat a condition of the subject, wherein the condition comprises rheumatoid arthritis.

* * * * *